United States Patent
Ishihara et al.

(10) Patent No.: US 9,315,383 B2
(45) Date of Patent: Apr. 19, 2016

(54) OXYGEN ABSORBING AGENT AND METHOD FOR STORING THE SAME

(75) Inventors: Emi Ishihara, Tokyo (JP); Tomoharu Himeshima, Matsudo (JP); Tatsuo Iwai, Ibaraki (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 13/814,313

(22) PCT Filed: Jan. 27, 2012

(86) PCT No.: PCT/JP2012/051874
§ 371 (c)(1),
(2), (4) Date: Apr. 19, 2013

(87) PCT Pub. No.: WO2012/105457
PCT Pub. Date: Aug. 9, 2012

(65) Prior Publication Data
US 2013/0209350 A1 Aug. 15, 2013

(30) Foreign Application Priority Data

Jan. 31, 2011 (JP) .................................. 2011-018413
Nov. 29, 2011 (JP) .................................. 2011-260595
Nov. 29, 2011 (JP) .................................. 2011-260634

(51) Int. Cl.
*C01B 13/00* (2006.01)
*B01D 53/02* (2006.01)
*C22C 1/04* (2006.01)
*C22C 1/08* (2006.01)
*C22C 21/00* (2006.01)
*C22C 38/00* (2006.01)
*C22C 19/00* (2006.01)
*C22C 19/03* (2006.01)
*B22F 9/16* (2006.01)
*C22C 33/02* (2006.01)
*B65D 81/18* (2006.01)
*C01B 13/02* (2006.01)
*B01J 20/02* (2006.01)
*B22F 9/04* (2006.01)
*A23L 3/3436* (2006.01)

(52) U.S. Cl.
CPC .............. *C01B 13/00* (2013.01); *B01D 53/02* (2013.01); *B01J 20/02* (2013.01); *B22F 9/16* (2013.01); *B65D 81/18* (2013.01); *C01B 13/0281* (2013.01); *C22C 1/04* (2013.01); *C22C 1/08* (2013.01); *C22C 19/007* (2013.01); *C22C 19/03* (2013.01); *C22C 21/00* (2013.01); *C22C 33/0228* (2013.01); *C22C 38/00* (2013.01); *A23L 3/3436* (2013.01); *B01D 2253/1122* (2013.01); *B01D 2257/104* (2013.01); *B22F 2009/043* (2013.01); *B22F 2009/045* (2013.01); *B22F 2999/00* (2013.01); *Y10T 428/12479* (2015.01)

(58) Field of Classification Search
CPC ........... B22F 9/16; C22B 7/007; C01B 13/00; B01D 53/02
USPC .......................................................... 423/579
See application file for complete search history.

(56) References Cited

U.S. PATENT DOCUMENTS

| | | | |
|---|---|---|---|
| 4,756,436 A | 7/1988 | Morita et al. | |
| 5,026,594 A | 6/1991 | Akao | |
| 5,262,375 A | 11/1993 | McKedy | |
| 2002/0086929 A1 | 7/2002 | Chiang et al. | |
| 2003/0040564 A1 | 2/2003 | Tung et al. | |
| 2009/0158890 A1* | 6/2009 | Garbar et al. ................... | 75/332 |
| 2010/0068379 A1 | 3/2010 | Rollick | |
| 2014/0291178 A1 | 10/2014 | Masuda et al. | |
| 2014/0336047 A1 | 11/2014 | Ishihara et al. | |

FOREIGN PATENT DOCUMENTS

| | | |
|---|---|---|
| CN | 1332034 | 1/2002 |
| EP | 0761348 | 3/1997 |
| JP | 54-99092 | 8/1979 |
| JP | 56-2845 | 1/1981 |
| JP | 62-001824 | 1/1987 |
| JP | 62-277148 | 12/1987 |
| JP | 8-238081 | 9/1996 |
| JP | 9-253481 | 9/1997 |
| JP | 09253481 A * | 9/1997 |
| JP | 11-240095 | 9/1999 |
| JP | 2002-320662 | 11/2002 |
| JP | 3496427 | 11/2003 |

(Continued)

OTHER PUBLICATIONS

International Search Report for PCT/JP2012/051874, mailed May 1, 2012.

(Continued)

*Primary Examiner* — Weiping Zhu
(74) *Attorney, Agent, or Firm* — Greenblum & Bernstein, P.L.C.

(57) ABSTRACT

There is provided an oxygen absorbing agent that can have a capability of absorbing oxygen in an atmosphere even when the atmosphere is free or substantially free from moisture. The oxygen absorbing agent comprises a metal, the metal having been obtained by subjecting an alloy comprising (A) at least one transition metal selected from the group consisting of manganese, iron, platinum, and copper group metals and (B) at least one metal selected from the group consisting of aluminum, zinc, tin, lead, magnesium, and silicon to treatment with an acidic or alkaline aqueous solution to elute and remove at least a part of the component (B).

18 Claims, No Drawings

(56) References Cited

FOREIGN PATENT DOCUMENTS

| | | |
|---|---|---|
| JP | 2004-201640 | 7/2004 |
| JP | 2005-104064 | 4/2005 |
| JP | 2007-038523 | 2/2007 |
| JP | 2007-185653 | 7/2007 |
| JP | 4001614 | 8/2007 |
| JP | 2008-55320 | 3/2008 |
| JP | 4248986 | 1/2009 |
| JP | 4501044 | 4/2010 |
| WO | 2010/147097 | 12/2010 |
| WO | 2012/105457 | 8/2012 |

OTHER PUBLICATIONS

Written Opinion of the International Searching Authority for PCT/JP2012/051874, mailed/dated May 1, 2012.
Japanese Office Action for patent family member JP Patent App. No. 2012-538007, mailed Dec. 18, 2012, along with corresponding English language translation.
English translation of the International Preliminary Report on Patentability for International Application No. PCT/JP2012/051874, mailed on Aug. 15, 2013.
China Office action, mail date is Sep. 9, 2013 along with an English language translation thereof.
Extended European Search Report in respect to European Application No. 12742360.6, dated Sep. 10, 2014.
International Preliminary Report on Patentability for PCT/JP2012/079544, mailed May 20, 2014.
International Search Report for PCT/JP2012/079544, issued Jan. 15, 2013.
United States Office Action in respect to U.S. Appl. No. 14/236,452, mailed Mar. 20, 2015.

* cited by examiner

OXYGEN ABSORBING AGENT AND METHOD FOR STORING THE SAME

TECHNICAL FIELD

The present invention relates to an oxygen absorbing agent. More specifically, the present invention relates to an oxygen absorbing agent that can absorb and remove oxygen even in a low-humidity atmosphere, and a method for storing the same.

BACKGROUND OF THE INVENTION

One of techniques for preserving foods, pharmaceutical products and the like is preservation utilizing oxygen absorbing agents (oxygen scavengers). Specifically, the preservation utilizing oxygen absorbing agents is a technique in which an oxygen scavenger capable of absorbing oxygen in atmosphere, together with an object, is placed within a hermetically sealable packaging body, and the inside of the hermetically sealable packaging body is brought to an oxygen-free state to prevent an oxidation-derived deterioration, a fungal deterioration, discoloration and the like of objects.

Oxygen scavengers formed of various inorganic materials and oxygen scavengers formed of various organic materials have hitherto been proposed for the removal of oxygen in atmosphere. Examples thereof include oxygen scavengers comprising inorganic main agents, for example, iron or other metal powders, sulfites, bisulfites, and dithionite, and oxygen scavengers comprising organic main agents, for example, L-ascorbic acid, erythorbic acid and salts thereof, saccharides such as glucose, and reducing polyhydric alcohols such as cathecol and pyrogallol.

These conventional oxygen scavengers, however, suffer from a problem that, in use, when a material that can supply water or moisture does not exist, an oxygen scavenging capability high enough to be used for practical use cannot be provided. Specifically, in conventional oxygen scavengers, an oxygen scavenging capability high enough to be used for practical use cannot be provided without mixing of the material with water or moisture retained thereon, for example, compounds containing water of crystallization, in use, or utilization of water vapor released from foods or the like to be preserved. Accordingly, difficulties have been encountered in applying conventional oxygen scavengers to pharmaceutical products or dried foods that should be used or preserved under drying conditions, or to storage of metal products that are weak against water or moisture without rusting.

Accordingly, oxygen absorbing agents that do not require moisture in oxygen absorption have been demanded in these applications. Oxygen absorbing agents reported as meeting this demand include, for example, oxygen scavengers comprising cerium oxide utilizing oxygen defects as a main agent (Japanese Patent Application Laid-Open No. 185653/2007), oxygen scavengers comprising titanium oxide containing oxygen defects as a main agent (Japanese Patent Application Laid-Open No. 104064/2005), oxygen scavengers comprising a metal subjected to hydrogen reduction as a main agent (Japanese Patent Application Laid-Open No. 277148/1987), and oxygen scavengers that utilize autoxidation of organic substances.

Among the above oxygen scavengers, oxygen scavengers disclosed in Japanese Patent Application Laid-Open No. 185653/2007 and Japanese Patent Application Laid-Open No. 104064/2005 utilize rare metals as starting metals that are rare and expensive. Further, the rare metals should be obtained through import from foreign countries, and, thus, depending upon further situation development, there is a possibility that the purchase of stock is varied, making it impossible to provide stable amount of production. Accordingly, these oxygen scavengers are not always satisfactory from the viewpoints of cost and stable supply of the rare metals. The oxygen scavenger disclosed in Japanese Patent Application Laid-Open No. 277148/1987 requires the provision of a large hydrogen reduction equipment in the production thereof and thus cannot be simply produced and, at the same time, cannot be said to have good handleability in the atmosphere. Furthermore, the oxygen scavenger utilizing autoxidization of the organic substance utilizes an oxidation reaction of the organic substance as the main agent, posing a problem of a by-product produced after oxygen absorption.

Accordingly, there is still a demand for an oxygen absorbing agent that can absorb oxygen in the atmosphere even in a moisture-free or substantially moisture-free atmosphere, is advantageous in stable availability of starting materials at low cost, is substantially free from the problem of the by-product, and is not necessary to provide a large apparatus for hydrogen reduction as an incidental equipment.

PRIOR ART DOCUMENTS

Patent Documents

Patent document 1: Japanese Patent Application Laid-Open No. 185653/2007

Patent document 2: Japanese Patent Application Laid-Open No. 104064/2005

Patent document 3: Japanese Patent Application Laid-Open No. 277148/1987

SUMMARY OF THE INVENTION

The present inventors have now unexpectedly found that a metal obtained by removing only aluminum from an alloy composed of aluminum and iron or an alloy composed of aluminum and nickel using an aqueous sodium hydroxide solution can absorb and remove oxygen in an atmosphere, even in a moisture-free or substantially moisture-free atmosphere having a humidity of not more than 30% RH (25° C.), on the same level as conventional oxygen scavengers. Conventional oxygen scavengers (oxygen absorbing agents), when absorb oxygen utilizing the oxidation reaction, utilize moisture (for example, humidity of not less than 60% RH (25° C.)) in the atmosphere or moisture that has been retained within an oxygen absorbing agent packaged bag per se. It has been found that the use of the metal found by the present inventors can allow oxygen in the atmosphere to be absorbed without need to utilize the moisture. It has also been found that, in the production of the metal, starting metals used are relative inexpensive and can be expected to be stably supplied, and a by-product is hardly produced. The present invention has been made based on such finding.

Accordingly, an object of the present invention is to provide an oxygen absorbing agent that can absorb oxygen in the atmosphere even in a moisture-free or substantially moisture-free atmosphere, is advantageous in stable availability of starting materials at low cost, is substantially free from the problem of the by-product, and is not necessary to provide a large apparatus for hydrogen reduction as an incidental equipment.

The present inventors have made further studies and, as a result, have found that the above metals, even when stored in water at room temperature, have a very high level of oxygen absorption activity and thus undergo a lowering in oxygen absorption activity with the elapse of time. For example, a metal obtained by removing only aluminum from an alloy composed of aluminum and nickel using an aqueous sodium hydroxide solution, when stored in water for one week, undergoes a lowering in oxygen absorption activity to about 20% of the initial oxygen absorption activity.

Methods known in the art for stably storing highly active metals for a long period of time include, for example, (i) storage in ethanol, (ii) storage in secondary and tertiary alcohols such as isopropanol and tert-butyl alcohol, (iii) storage in a container subjected to hydrogen substitution, and (iv) storage at low temperatures.

Both the storage methods (i) and (ii) use organic solvents that are disadvantageously combustible and have a low flash point (11° C.). Accordingly, there is a possibility of burning. The storage method (iii) performs hydrogen substitution that poses a problem of safety in handling. The storage method (iv) involves troublesome freezing and thawing operation. The operation is likely to cause loss of or a lowering in oxygen absorption activity and incurs a high cooling cost.

The present inventors have now noticed that, when an oxygen absorbing agent composed of the metal prepared above is stored in water, pH of water increases with the elapse of time and the oxygen absorption activity disadvantageously lowers with an increase in pH. The present inventors have found that, when the oxygen absorbing agent is immersed in an aqueous acidic solution and, in this state, is stored, the oxygen absorbing agent can be stably stored while maintaining the oxygen absorption activity of the oxygen absorbing agent for a long period of time. The present invention has been made based on such finding.

Accordingly, another object of the present invention is to provide a method for storing an oxygen absorbing agent that, even in a moisture-free or substantially moisture-free atmosphere, can absorb oxygen in the atmosphere and, at the same time, is highly safe, is low in cost, and can stably store the oxygen absorbing agent for a long period of time.

According to a first aspect of the present invention, there is provided an oxygen absorbing agent comprising a metal, the metal having been obtained by subjecting an alloy comprising (A) at least one transition metal selected from the group consisting of manganese, iron, platinum, and copper group metals and (B) at least one metal selected from the group consisting of amphoteric metals, magnesium, and silicon to treatment with an acidic or alkaline aqueous solution to elute and remove at least a part of the component (B).

According to a second aspect of the present invention, there is provided a method for storing an oxygen absorbing agent, the method comprising:

providing an oxygen absorbing agent comprising a metal, the metal having been obtained by subjecting an alloy comprising (A) at least one transition metal selected from the group consisting of manganese, iron, platinum, and copper group metals and (B) at least one metal selected from the group consisting of aluminum, zinc, tin, lead, magnesium, and silicon to treatment with an acidic or alkaline aqueous solution to elute and remove at least a part of the component (B);

immersing the oxygen absorbing agent in an aqueous solution; and storing the oxygen absorbing agent in the aqueous solution while maintaining the aqueous solution at a pH value of 11 or less.

According to a third aspect of the present invention, there is provided a method for storing an oxygen absorbing agent, the method comprising:

providing an oxygen absorbing agent comprising a metal, the metal having been obtained by subjecting an alloy comprising (A) at least one transition metal selected from the group consisting of manganese, iron, platinum, and copper group metals and (B) at least one metal selected from the group consisting of aluminum, zinc, tin, lead, magnesium, and silicon to treatment with an acidic or alkaline aqueous solution to elute and remove at least a part of the component (B); and immersing the oxygen absorbing agent in an aqueous solution containing an acid added thereto to store the oxygen absorbing agent.

According to the present invention, there is also provided an oxygen absorbing resin composition comprising the above oxygen absorbing agent and thermoplastic resin.

According to the present invention, there is also provided an oxygen absorbing agent packaged body comprising: the above oxygen absorbing agent or the oxygen absorbing resin composition; and a packaging material, the whole or a part of which is formed of an air-permeable packaging material, the oxygen absorbing agent or the oxygen absorbing resin composition having been packaged into the packaging material.

The oxygen absorbing agent according to the present invention can absorb and remove oxygen in an atmosphere, even in a moisture-free or substantially moisture-free atmosphere, on the same level as conventional oxygen scavengers and thus is suitable for use in applications where conventional oxygen scavengers cannot be applied, for example, where the atmosphere of the inside of packages of dried foods, pharmaceutical products, and electronic materials weak against moisture is brought to an oxygen-free state.

Further, the method for storing an oxygen absorbing agent according to the present invention can allow the oxygen absorbing agent to be stably stored from just after the production thereof, can allow the oxygen absorbing agent to maintain the same oxygen absorption activity as that just after the production thereof even after long-term storage, and can allow the oxygen absorbing agent to absorb and remove oxygen in an atmosphere, even in a moisture-free or substantially moisture-free atmosphere, on the same level as conventional oxygen scavengers.

DETAILED DESCRIPTION OF THE INVENTION

Oxygen Absorbing Agent

The oxygen absorbing agent according to the first aspect of the present invention comprises a metal, the metal having been obtained by subjecting an alloy comprising, two components, that is, (A) at least one transition metal selected from the group consisting of manganese, iron, platinum, and copper group metals and (B) at least one metal selected from the group consisting of amphoteric metals, magnesium, and silicon, to treatment with an acidic or alkaline aqueous solution to elute and remove at least a part of the component (B). The term "oxygen absorbing agent" as used herein refers to an oxygen absorbing agent that can selectively absorb oxygen from an atmosphere around a place where the oxygen absorbing agent has been installed.

Component (A)

The transition metal usable as the component (A) constituting the oxygen absorbing agent is selected from manganese group metals (manganese, technetium, and rhenium), iron group metals (iron, cobalt, and nickel), platinum group metals (ruthenium, rhodium, palladium, osmium, iridium, and platinum), and copper group metals (copper, silver, and gold). The transition metals may be used either solely or in a combination of two or more of them. For example, when iron and nickel are selected, an Fe—Ni alloy may be used as the component (A).

The component (A) is preferably manganese, iron, cobalt, nickel, or copper, more preferably iron, cobalt, nickel, or copper, still more preferably iron or nickel, particularly preferably iron. Among them, iron is preferred because of high safety and low cost.

Component (B)

The component (B) constituting the oxygen absorbing agent is selected from aluminum, zinc, tin, lead, magnesium, and silicon. They may be used either solely or in a combination of two or more of them. The component (B) is, among the metals exemplified as the component (B), preferably a metal selected from aluminum, zinc, magnesium, and silicon, more preferably aluminum, zinc, magnesium, or silicon, still more preferably aluminum. Among them, aluminum is preferred because of low cost.

In the preparation of the oxygen absorbing agent according to the present invention, an alloy comprising the component (A) and the component (B) is prepared. Molybdenum, chromium, titanium, vanadium, tungsten and the like may be further added as additive metals to the alloy. The alloy may further comprise additive components such as cyanic acids.

The alloy comprising the component (A) and the component (B) may be prepared by a melting method. Regarding the composition ratio of the component (A) and the component (B), preferably, when the proportion of the component (A) is 20 to 80% by weight, the proportion of the component (B) is 20 to 80% by weight. More preferably, when the proportion of the component (A) is 30 to 70% by weight, the proportion of the component (B) is 30 to 70% by weight. More specifically, for example, when the component (A) and the component (B) are iron or nickel and aluminum, respectively, preferably, the proportion of iron or nickel is 30 to 55% by weight while the proportion of aluminum is 45 to 70% by weight.

The alloy as such may be subjected to treatment with an acidic or alkaline aqueous solution. In general, the alloy is finely ground before the treatment with the acidic or alkaline aqueous solution. The term "alloy" as used herein refers to an alloy having a single composition that has a specific crystal structure, as well as an alloy mixture or a mixture of metals per se.

The alloy may be finely ground by a method properly selected from commonly used metal crushing/grinding methods. An example of the finely grinding method is one in which the alloy is ground by a jaw crusher, a roll crusher, a hammer mill or the like, and, if necessary, fine grinding with a ball mill is further performed. Alternatively, a method may also be adopted in which a molten metal of the alloy is finely ground by rapid solidification such as atomization. When atomization is adopted, fine grinding in an inert gas such as an argon gas is preferred. The atomization may be performed by a method described, for example, in Japanese Patent Application Laid-Open No. 23597/1993.

The particle diameter of the alloy powder is preferably in the range of 5 to 200 μm. The particle size distribution is preferably as narrow as possible. Sieving (classification) with commercially available mesh sieves (for example, 200-mesh sieves) may be properly performed from the viewpoints of removing large particles and providing uniform particle size distribution. The atomization is likely to provide near spherical powder particles and, at the same time, to provide a narrow particle size distribution.

The alloy or alloy powder thus obtained is treated with an acidic or alkaline aqueous solution to elute and remove at least a part of the component (B). That is, a metal obtained by eluting and removing at least a part of the component (B) from the alloy is used as the oxygen absorbing agent in the storing method according to the present invention. The acidic or alkaline aqueous solution is not particularly limited as long as the acidic or alkaline aqueous solution is one that does not dissolve or hardly dissolves the component (A), but on the other hand, the component (B) is mainly dissolved therein, and one that dissolves both the components (A) and (B) with the dissolution speed of the component (B) being higher than that of the component (A). Examples of acids usable in the acidic aqueous solution include hydrochloric acid, sulfuric acid, and nitric acid. Examples of alkalis usable in the alkaline aqueous solution include sodium hydroxide, potassium hydroxide, calcium hydroxide, tetramethylammonium hydroxide (TMAH), $Na_2CO_3$, $K_2CO_3$, and ammonia. In the acidic or alkaline aqueous solution, a combination of two or more of the acids or a combination of two or more of the alkalis may if necessary be used.

In a preferred embodiment of the present invention, the acidic or alkaline aqueous solution is preferably an alkaline aqueous solution, more preferably an aqueous solution of sodium hydroxide. For example, when aluminum is used as the component (B), the use of an aqueous sodium hydroxide solution as the alkaline aqueous solution is advantageous in that the removal of excess sodium hydroxide by water washing and the removal of eluted aluminum are easy and, thus, the effect of reducing the necessary times of water washing can be expected.

In the treatment with the acidic or alkaline aqueous solution, for alloy powder, it is common practice to introduce the alloy powder little by little into an acidic or alkaline aqueous solution with stirring. Alternatively, a method may be adopted in which the alloy powder is previously placed in water and a concentrated acid or alkali is added dropwise to the water containing the alloy powder.

In the treatment with the acidic or alkaline aqueous solution, the concentration of the acidic or alkaline aqueous solution is, for example, 5 to 60% by weight. More specifically, when sodium hydroxide is used, the concentration is preferably 10 to 40% by weight.

In the treatment with the acidic or alkaline aqueous solution, the temperature of the aqueous solution is, for example, preferably approximately 20 to 120° C., more preferably 25 to 100° C.

The treatment time for the treatment of the alloy or alloy powder with the acidic or alkaline aqueous solution may vary depending, for example, upon the shape, state, and amount of the alloy used, the concentration of the acidic or alkaline aqueous solution, and the temperature of the treatment but is generally approximately 30 to 300 min. The amount of the component (B) eluted from the alloy may be regulated by regulating the treatment time.

In the present invention, at least a part of the component (B) is eluted and removed from the alloy by the treatment with the acidic or the alkaline aqueous solution. Here eluting and removing "at least a part of the component (B)" means the elution and removal of a part of the component (B) from the alloy comprising the component (A) and the component (B), as well as the elution and removal of the whole component (B) from the alloy comprising the component (A) and the component (B). It cannot be denied that there is possibility that, in the process of eluting the component (B), a part of the component (A) is dissolved in the acidic or alkaline aqueous solution. Accordingly, "at least a part of the component (B)" is not limited to the elution of only the component (B) by the treatment with the acidic or alkaline aqueous solution.

At least a part, preferably a large proportion, of the component (B) (for example, aluminum) is eluted from the alloy by the treatment with the acidic or alkaline aqueous solution. The proportion of the elution of the component (B) from the alloy can be expressed in terms of the content (on a weight basis) (residual ratio) of the component (B) in the metal obtained after the elution and removal.

The content of the component (B) in the metal used as the oxygen absorbing agent (that is, the metal after the elution of the component (B)) is preferably 0.01 to 50% by weight, more preferably 0.1 to 40% by weight. More specifically, for example, when the alloy is an Al—Fe alloy, the content of aluminum in the metal obtained by eluting and removing aluminum by the treatment with the acidic or alkaline aqueous solution from the alloy is preferably 0.01 to 50% by weight, more preferably 0.1 to 40% by weight, still more preferably 1 to 5% by weight. The content of the component (B) (for example, aluminum) in the metal used in the oxygen absorbing agent may be measured, for example, by an ICP method.

The metal obtained as described above has a porous shape (or is in a porous body form). The porous shape refers to such a state that a number of pores having a size observable under an electron microscope are present on the surface or in the inside of the metal. In the present invention, the porosity in the porous shape of the metal can be expressed in terms of specific surface area. Specifically, the specific surface area of the metal used in the oxygen absorbing agent according to the present invention is at least 10 $m^2/g$, preferably at least 20 $m^2/g$, more preferably at least 40 $m^2/g$, as measured by a BET method.

For example, in the present invention, when iron and aluminum are used as the component (A) and the component (B), respectively, the specific surface area (measured by the BET method) of the resultant porous metal is approximately 20 to 40 $m^2/g$, whereas a nonporous conventional iron powder (reduced iron powder or atomized iron powder) has a specific surface area of approximately 0.07 to 0.13 $m^2/g$, demonstrating that the former is porous.

The porosity in the porous shape of the metal may also be expressed in terms of bulk density. The bulk density of the metal used in the oxygen absorbing agent according to the present invention is not more than 2 $g/cm^3$, preferably not more than 1.5 $g/cm^3$. Incidentally, the nonporous conventional iron powder (reduced iron powder or atomized iron powder) has a bulk density of approximately 2 to 3 $g/cm^3$.

In the present invention, the porous metal used in the oxygen absorbing agent has a high level of oxygen absorption activity and thus may also be of course suitable for use as an oxygen absorbing agent even under an atmosphere having a low humidity (for example, 30% RH or less (relative humidity) (25° C.)). It is needless to say that the porous metal is also suitable as oxygen absorbing agents even under high-humidity conditions (for example, under 100% RH (relative humidity) (25° C.) conditions.

Accordingly, the metal obtained as described above can absorb at least 5 mL/g of oxygen, more preferably 10 mL/g of oxygen under an atmosphere having a low humidity of 30% RH or less (relative humidity) (25° C.). When the metal is used as the oxygen absorbing agent, the amount of oxygen absorbed is 5 to 150 mL/g under an atmosphere having a low humidity of 30% RH or less (relative humidity) (25° C.).

Method for Storing Oxygen Absorbing Agent

After the treatment for the elution and removal of the component (B), in general, the metal is then washed with water. The metal or metal powder thus obtained generally immediately undergoes a deterioration by oxidation in the air. Accordingly, after the treatment of the alloy comprising the component (A) and the component (B) with the acidic or alkaline aqueous solution, caution is required so as to minimize the contact of the metal and the alloy with oxygen. To meet this requirement, the practice of a series of treatments in an aqueous solution or water to obtain a treated metal which as such is stored in the aqueous solution or water, or storage under oxygen-free conditions or under an inert gas is considered effective. However, it has been found that the storage of the metal in water causes the oxygen absorption activity to be lowered with the elapse of time although a rapid lowering in the oxygen absorption activity can be prevented. The storage under oxygen-free conditions or under an inert gas disadvantageously incurs an increased cost due to the necessity of apparatuses or the like.

In the present invention, the storage of the oxygen absorbing agent formed of the metal by immersing in a specific aqueous solution which will be described later can realize stable storage just after the production of the oxygen absorbing agent, can allow the oxygen absorption activity on the same level as that just after the production of the oxygen absorbing agent to be maintained even after long-term storage, and can allow oxygen in an atmosphere to be absorbed and removed on the same level as conventional oxygen scavengers even in a moisture-free or substantially moisture-free atmosphere.

Storing Method According to Second Aspect of the Present Invention

The storing method according to the second aspect of the present invention comprises storing the oxygen absorbing agent obtained as described above in an aqueous solution containing an acid added thereto. The present inventors have noticed that, due to the treatment with an alkali such as sodium hydroxide for elution of the component (B) in the production of the oxygen absorbing agent, a metal hydroxide such as sodium hydroxide stays within pores formed in the metal formed by the elution of the component (B) and cannot be fully removed after the step of water washing and the metal hydroxide residue is gradually eluted in water during storage of the oxygen absorbing agent in water. Further, the present inventors have found that the elution of the metal hydroxide residue results in an increase in pH of water as the storage medium, leading to lowered oxygen absorption activity of the oxygen absorbing agent. As a result of further studies, it has been found that, when the oxygen absorbing agent is immersed and stored in an acidic aqueous solution, the oxygen absorbing agent can be stored while maintaining the oxygen absorption activity. pH is a value determined from an electromotive force measured with a glass electrode pH meter using as a standard a pH value of a pH standard solution specified in JIS (Japanese Industrial Standards) K 0211, K 0213, and Z 8805. The pH value is measured by a method specified in JIS Z 8802 in the temperature range of 0 to 40° C.

Water is suitable as the storage medium in which the oxygen absorbing agent is immersed, from the viewpoints of safety and cost. Accordingly, an aqueous solution containing an acid added thereto is used as the aqueous solution in which the oxygen absorbing agent is immersed. The "acid" as used herein means a substance that, when added to an aqueous solution, donates protons to water molecules ($H_2O$). The acid is not particularly limited as long as it meets the above requirement. An acid having a $pK_a$ value of not less than 1 is suitable for use. $pK_a$ means an acid dissociation constant that is a constant defined by $pK_a=-\log_{10}K_a$ wherein Ka is an equilibrium constant in a dissociation equilibrium state: $HA=H^++A^-$ and is $[H^+][A^-]/[HA]$.

Preferred acids include inorganic acids such as phosphoric acid, sulfuric acid, hydrofluoric acid, carbonic acid, oxalic acid, and chloroacetic acid, or organic acids such as citric acid, glycine, tartaric acid, malic acid, maleic acid, ascorbic acid, gallic acid, lactic acid, and uric acid. Among them, citric acid, malic acid, tartaric acid, and maleic acid are preferred.

The concentration of the aqueous solution containing an acid added thereto is preferably in the range of 5 mM to 1 M. When the oxygen absorbing agent is stored in the acidic aqueous solution having this concentration, a lowering in oxygen absorption activity with the elapse of time can be further suppressed.

In the present invention, preferably, the oxygen absorbing agent is immersed and stored at room temperature in an aqueous solution in an amount of twice the weight of the oxygen absorbing agent. When the amount of the aqueous solution is smaller than the above-defined range, in some cases, the oxygen absorbing agent cannot be satisfactorily immersed in the aqueous solution, resulting in a reduced effect.

Storing Method According to Third Aspect of the Present Invention

The storing method according to the third aspect of the present invention comprises immersing and storing the oxygen absorbing agent in an aqueous solution while maintaining pH of the aqueous solution at 11 or less. The present inventors have noticed that, due to the treatment with an alkali such as sodium hydroxide for elution of the component (B) in the production of the oxygen absorbing agent, a metal hydroxide such as sodium hydroxide stays within pores formed in the metal formed by the elution of the component (B) and cannot be fully removed after the step of water washing and the metal hydroxide residue is gradually eluted in water during storage of the oxygen absorbing agent in water. Further, the present inventors have found that the elution of the metal hydroxide residue results in an increase in pH of water as the storage medium, leading to lowered oxygen absorption activity of the oxygen absorbing agent. As a result of further studies, it has been found that, when the oxygen absorbing agent is immersed and stored in the storage medium while maintaining the storage medium at a pH value of 11 or less, the oxygen absorbing agent can be stored while maintaining the oxygen absorption activity. pH is a value determined from an electromotive force measured with a glass electrode pH meter using as a standard a pH value of a pH standard solution specified in JIS (Japanese Industrial Standards) K 0211, K 0213, and Z 8805. The pH value is measured by a method specified in JIS Z 8802 in a temperature range of 0° C. to 40° C.

Water is suitable as the storage medium in which the oxygen absorbing agent is immersed, from the viewpoints of safety and cost. When the storage medium (aqueous solution) is water to which a buffering solution has been added, that is, has a buffer action, the aqueous solution can be maintained at a pH value of 11 or less even in storage of the oxygen absorbing agent for a long period of time. When the oxygen absorbing agent is stored in the aqueous solution having a buffer action, the pH value of the aqueous solution is preferably in the range of 7 to 11. When the oxygen absorbing agent is stored in an acidic aqueous solution, disadvantageously, there is a possibility that the component (A) (for example, iron (Fe) component) in the oxygen absorbing agent is dissolved in the aqueous solution.

The buffer solution to be added to water is preferably a pH buffer solution comprising at least one weak acid and strong base selected from inorganic acids and organic acids, or a pH buffer solution comprising a weak acid and a salt of the weak acid. The term "weak acid" as used herein means an acid having a pKa (acid dissociation constant) of not less than 2, and the term "strong base" as used herein means a base having a pKb (base dissociation constant) of not more than 0 (zero).

One or more buffer solutions selected from a 3,3-dimethylglutaric acid/sodium hydroxide buffer solution, a 3,3-dimethylglutaric acid/sodium hydroxide/sodium chloride buffer solution, a sodium cacodylate/hydrochloric acid buffer solution, a maleic acid/trishydroxymethylaminomethane/sodium hydroxide buffer solution, a potassium dihydrogenphosphate/sodium hydroxide buffer solution, a phosphate buffer solution, an imidazole/hydrochloric acid buffer solution, a 2,4,6-trimethylpyridine/hydrochloric acid buffer solution, a triethanolamine hydrochloride/sodium hydroxide buffer solution, a sodium 5,5-diethylbarbiturate/hydrochloric acid buffer solution, an N-ethylmorpholine/hydrochloric acid buffer solution, a sodium pyrophosphate/hydrochloric acid buffer solution, a Tris/hydrochloric acid buffer solution, a Bicine/sodium hydroxide buffer solution, a 2-amino-2-methylpropane-1,3-diol/hydrochloric acid buffer solution, a diethanolamine/hydrochloric acid buffer solution, a potassium p-phenolsulfonate/sodium hydroxide buffer solution, a boric acid/sodium hydroxide buffer solution, a sodium borate/hydrochloric acid buffer solution, an ammonia/ammonium chloride buffer solution, a sodium carbonate/sodium hydrogencarbonate buffer solution, a sodium borate/sodium hydroxide buffer solution, a sodium hydrogencarbonate/sodium hydroxide buffer solution, a glycine/sodium hydroxide buffer solution, and a sodium hydrogenphosphate/sodium hydroxide buffer solution are suitable as the pH buffer solution in the present invention. A glycine/sodium hydroxide buffer solution is particularly preferred.

The concentration of the aqueous solution may vary depending upon the amount of the oxygen absorbing agent immersed but is preferably 5 mM or more and a saturated concentration or less. The saturated concentration means the concentration of the largest amount of solute that can be dissolved in a given amount of water under certain temperature conditions. When the concentration of the aqueous solution is lower, the influence of the solute on the oxygen absorbing agent which is the storage object is smaller. However, when the concentration of the aqueous solution is excessively low, there is possibility that the buffering function cannot be maintained. Accordingly, a concentration of not less than 5 mM is necessary. On the other hand, the upper limit of the concentration of the aqueous solution is not particularly limited. However, the upper limit of the concentration of the aqueous solution is generally about 5 M from the viewpoint of a problem of the preparation of the aqueous solution.

In the present invention, preferably, the oxygen absorbing agent is immersed and stored at room temperature in an aqueous solution in an amount of twice the weight of the oxygen absorbing agent. When the amount of the aqueous solution is smaller than the above-defined range, in some case, the oxygen absorbing agent cannot be satisfactorily immersed in the aqueous solution, leading to a reduced effect.

After storage, in use of the oxygen absorbing agent, the oxygen absorbing agent may be taken out from the aqueous solution having pH 7 to pH 11 followed by drying. However, as described above, the oxygen absorbing agent is likely to be deteriorated by oxidation in the air. Accordingly, from the viewpoint of preventing a lowering in oxygen absorption activity, for example, a method is preferably adopted in which, before use, the oxygen absorbing agent is dried under such conditions that the influence of oxygen is removed as much as possible, for example, by vacuum drying.

The oxygen absorbing agent according to the present invention can absorb oxygen regardless of water activity and can be applied to a region having high water activity to a region having a low water activity. Further, the oxygen absorbing agent according to the present invention is suitable for commodities that have low water activity and should be stored under low-humidity drying conditions. The water activity refers to a measure of the content of free water in commodities and is expressed by a numeral value of 0 to 1 wherein the water activity of water-free commodities is 0 (zero) and the water activity of pure water is 1. That is, the water activity is defined as follows.

$$Aw=P/P_0=RH/100$$

wherein Aw represents the water activity of a commodity; P represents a water vapor pressure within a space after the commodity is hermetically sealed and is brought to an equilibrium state; $P_0$ represents a water vapor pressure of pure water; and RH represents a relative humidity within the space, %.

In order to store commodities having a low water content that should be stored under low-humidity conditions, the relative humidity (RH) of an atmosphere in which the commodities having a low water content are stored is preferably 20 to 70%, more preferably 20 to 50%. The water content of commodities having a low water content is preferably not more than 50% by weight, more preferably not more than 30% by weight, particularly preferably not more than 10% by weight. Commodities having a low water content (products to be packaged) that should be stored under low-humidity conditions include, for example, foods and pharmaceutical products that are weak against an increase in water content and are required to avoid inclusion of foreign materials, for example, powdery and granular foods (powder soups, powder beverages, powder confectioneries, seasoners, grain powders, nutritional foods, health foods, artificial colors, flavoring agents, and spices and condiments), powdery and granular pharmaceutical products (medicinal powders, powdered soaps, toothpastes, and heavy chemicals), and molded products (tablets) thereof. In particular, when the products to be packaged are filled into oxygen absorbing packaging bodies which will be described later, oxygen in an atmosphere, even in a moisture-free or substantially moisture-free atmosphere, can be absorbed and removed on the same level as that attained by conventional oxygen scavengers. Accordingly, the oxygen absorbing agent is suitable for use in applications where an atmosphere in packages of dried foods, pharmaceutical products, and electronic materials, which are weak against moisture and for which conventional oxygen scavengers cannot be applied, is brought to an oxygen-free state. The oxygen absorbing agent is suitable for use, for example, in dried foods such as powder seasoners, powder coffees, coffee beans, rices, teas, beans, baked rice chips, and rice crackers, pharmaceutical products and health foods such as vitamin preparations.

The oxygen absorbing packaged body according to a further embodiment of the present invention comprises: the above oxygen absorbing agent; and a packaging material, the whole or a part of which is formed of an air-permeable packaging material, the oxygen absorbing agent having been packaged into the packaging material. Examples of the packaging material include a packaging material prepared by laminating two air-permeable packaging materials and forming a bag from the laminate, a packaging material prepared by laminating one air-permeable packaging material and one air-impermeable packaging material and forming a bag from the laminate, and a packaging material prepared by folding one air-permeable packaging material and mutually sealing edges except for the folded part to form a bag. Packaging materials permeable to oxygen and carbon dioxide are usable as the air-permeable material. Examples of such air-permeable packaging materials include papers, nonwoven fabrics, and conventional plastic films that have been treated to render them permeable to air.

EXAMPLES

The present invention is further illustrated by the following Examples. However, the present invention is by no means to be construed as being limited to them.

Production and Evaluation of Oxygen Absorbing Agent

Example 1

An Al (aluminum) powder (50% by weight) and an Fe (iron) powder (50% by weight) were mixed together and were dissolved in each other in nitrogen to obtain an Al—Fe alloy. The Al—Fe alloy thus obtained was ground with a jaw crusher, a roll crusher, and a ball mill, and the ground product was classified with a net having an opening of 200 meshes (0.075 mm) to obtain an Al—Fe alloy having a particle size of not more than 200 meshes. The Al—Fe alloy powder (100 g) thus obtained was mixed while stirring for one hr in a 25% (by weight) aqueous sodium hydroxide solution of 50° C. The mixed solution was allowed to stand, and the upper layer liquid was removed. The residual precipitate was washed with distilled water until pH became 10 or less to obtain a porous Al—Fe metal powder. In order to avoid contact with oxygen, the porous metal powder was obtained by a reaction in an aqueous solution.

The porous metal powder thus obtained was dried in vacuo under conditions of not more than 200 Pa and 50° C. to a water content of not more than 1% by weight to obtain a dried product of a porous Al—Fe metal powder. The porous Al—Fe metal powder had a bulk density of 1.4 g/cm$^3$ (as measured according to JIS Z 2504). The dried product of the porous Al—Fe metal powder (1 g) was dissolved in a small amount of hydrochloric acid, and the solution was diluted with pure water to prepare 50 mL of a diluted solution. The content of Al in the metal powder thus obtained was calculated by an ICP method (ICPE-9000 (multitype), manufactured by Shimadzu Seisakusho Ltd.) using the diluted solution.

The average particle diameter of the metal powder was measured with a particle size/shape distribution measuring device ("PITA-2," manufactured by Seishin Enterprise Co., Ltd.) and was found to be about 30 μm. The specific surface area of the metal powder was measured with an automatic specific surface area measuring device (GEMINI VII2390, manufactured by Shimadzu Seisakusho Ltd.) and was found to be 24.0 m$^2$/g.

The metal powder (1 g) was packaged in an air-permeable small bag and, together with a desiccant, was placed in a gas barrier bag (an Al foil-laminated plastic bag). The gas barrier bag was filled with 500 mL of air (oxygen concentration: 20.9% by volume), was hermetically sealed, and was stored at 25° C. for one day. The concentration of oxygen within the gas barrier bag after the storage was measured by gas chromatography and was found to be 17.5% by volume. The amount of oxygen absorbed was calculated from the measured oxygen concentration and was found to be 21.0 mL/g.

Examples 2 to 10

Porous Al—Fe metal powders were prepared in the same manner as in Example 1, except that the amounts of Al and Fe incorporated, the concentration and temperature of the aqueous sodium hydroxide solution, and the time for mixing while stirring in the aqueous sodium hydroxide solution were varied. For the metal powders thus obtained, the average particle diameter, the specific surface area, the bulk density, the Al content, the oxygen concentration, and the oxygen absorbing capability were measured in the same manner as in Example Comparative Example 1

An Fe powder (purchased from JFE Steel Corporation) (1 g), together with 500 mL of air having a relative humidity of not more than 10% RH (25° C.), was sealed in a gas barrier bag (an Al foil-laminated plastic bag), and the gas barrier bag was stored at 25° C. for one day. The concentration of oxygen within the gas barrier bag after the storage was measured in the same manner as in Example 1 and was found to be 20.7% by volume (Table 1, calculated value of oxygen absorbed per g of Fe powder: 1 mL/g).

Comparative Example 2

The oxygen absorbing capability was measured in the same manner as in Comparative Example 1, except that an Ni powder (purchased from Toho Titanium Co., Ltd.) (1 g) was used instead of the Fe powder. As a result, the oxygen absorbing capability was found to be 20.7% by volume (Table 1, calculated value of oxygen absorbed per g of Ni powder: 1 mL/g).

The results of evaluation of Examples 1 to 11 and Comparative Examples 1 and 2 were as shown in Table 1.

TABLE 1

| | Example | | | | | | | | | | | Comparative Example | |
|---|---|---|---|---|---|---|---|---|---|---|---|---|---|
| | 1 | 2 | 3 | 4 | 5 | 6 | 7 | 8 | 9 | 10 | 11 | 1 | 2 |
| Metal powder used | Porous Al—Fe metal powder | | | | | | | | | | Porous Al—Ni metal powder | Fe powder | Ni powder |
| Average particle diameter (μm) | About 30 | About 30 | About 30 | About 30 | About 30 | About 30 | About 30 | About 30 | About 30 | About 30 | About 30 | About 200 | About 0.4 |
| Specific surface area (m$^2$/g) | 24 | 29 | 36 | 40 | 41 | 39 | 39 | 38 | 37 | 37 | 90 | 1 | 2 |
| Bulk density (g/cm$^3$) | 1.4 | 0.9 | 1.4 | 1.4 | 1.4 | 1.4 | 1.4 | 1.4 | 1.4 | 1.4 | 1.4 | 2.4 | 2.5 |
| Al content (wt %) | 13 | 3 | 5 | 3 | 2 | 2 | 3 | 5 | 4 | 3 | 8 | 1 or less | 1 or less |
| Oxygen concentration (vol %) | 17.5 | 4.7 | 6 | 14 | 15 | 9 | 14 | 14 | 14 | 14 | 5.8 | 20.7 | 20.7 |
| Amount of oxygen absorbed (mL/g) | 21 | 85 | 80 | 140 | 120 | 220 | 140 | 130 | 130 | 130 | 80 | 1 | 1 |

1. For Examples 5, 8 to 11, and 13, in the measurement of the oxygen concentration, the amount of the metal powder packaged within the air-permeable small bag was changed from 1 g to 0.3 g.

Example 11

An Al—Ni alloy powder was obtained in the same manner as in Example 1, except that an Ni (nickel) powder was used instead of the Fe powder. The Al—Ni alloy powder (100 g) thus obtained was mixed while stirring for one hr in a 25% (by weight) aqueous sodium hydroxide solution of 90° C. The mixed solution was allowed to stand, and the upper layer liquid was removed. The residual precipitate was washed with distilled water until pH became 10 or less to obtain a porous Al—Ni metal powder. For the metal powders thus obtained, the average particle diameter, the specific surface area, the bulk density, the Al content, the oxygen concentration, and the oxygen absorbing capability were measured in the same manner as in Example 1.

As is apparent from the results of evaluation shown in Table 1, the amount of oxygen absorbed by the oxygen absorbing agents according to the present invention was as high as not less than 20 mL/g even in a low-humidity atmosphere having a relative humidity of about 5% RH (25° C.).

Example 12

The porous Al—Fe metal powder (0.5 g) obtained in Example 8 was packaged in an air-permeable small bag and was then placed in a gas barrier bag (an Al foil-laminated plastic bag). The gas barrier bag was filled with 500 mL of dry air (relative humidity: not more than 1% RH, oxygen concentration: 20.9% by volume), was hermetically sealed, and was stored at 25° C. for 7 days. The concentration of oxygen within the gas barrier bag just after the storage and 3 hr, 4 days, and 7 days after the start of the storage was measured. Further, the oxygen concentration was measured in the same manner as described just above, except that the air filled into the small bag was changed to air having a relative humidity of 100% RH. The amount of oxygen absorbed was calculated from the measured oxygen concentration. The results were as shown in Table 2 below.

TABLE 2

| Storage time | Oxygen concentration (vol %) | | Oxygen absorption amount (mL/g) | |
|---|---|---|---|---|
| | Air with 1% RH or less | Air with 100% RH | Air with 1% RH or less | Air with 100% RH |
| 0 hr | 20.9 | 20.9 | 0 | 0 |
| 3 hr | 10.5 | 11.1 | 116 | 110 |
| 4 days | 9.35 | 9.9 | 127 | 122 |
| 7 days | 8.93 | 9.58 | 131 | 125 |

As is apparent from the results of evaluation shown in Table 2, the oxygen absorbing agent according to the present invention can maintain a high level of oxygen absorption amount over a long period of time regardless of the humidity of air.

Storage of Oxygen Absorbing Agent in Acidic Aqueous Solution

An Al (aluminum) powder (50% by weight) and an Fe (iron) powder (50% by weight) were mixed together and were dissolved in each other in nitrogen to obtain an Al—Fe alloy. The Al—Fe alloy thus obtained was ground with a jaw crusher, a roll crusher, and a ball mill, and the ground product was classified with a net having an opening of 200 meshes (0.075 mm) to obtain an Al—Fe alloy having a particle size of not more than 200 meshes. The Al—Fe alloy powder (150 g) thus obtained was mixed while stirring for one hr in a 30% (by weight) aqueous sodium hydroxide solution of 50° C. The mixed solution was allowed to stand, and the upper layer liquid was removed. The residual precipitate was washed with distilled water until pH became 10 or less to obtain a porous Al—Fe metal powder. In order to avoid contact with oxygen, the porous metal powder was obtained by a reaction in an aqueous solution.

The porous metal powder thus obtained was dried in vacuo under conditions of not more than 200 Pa and 80° C. to a water content of not more than 1% by weight to obtain a dried product of a porous Al—Fe metal powder. The metal powder thus obtained had a bulk density of 1.3 g/cm³ (as measured according to JIS Z 2504). The dried product (1 g) was packaged in an air-permeable small bag and, together with a desiccant, was placed in a gas barrier bag (an Al foil-laminated plastic bag). The gas barrier bag was filled with 500 mL of air (oxygen concentration: 20.9% by volume), was hermetically sealed, and was stored at 25° C. for one day.

The concentration of oxygen within the gas barrier bag after the storage at 25° C. for one day was measured by gas chromatography and was found to be 4.1% by volume. The amount of oxygen absorbed was calculated from the reduced oxygen concentration within the gas barrier bag and was found to be 87.6 mL/g.

The average particle diameter of the porous Al—Fe metal powder was measured with a particle size/shape distribution measuring device ("PITA-2," manufactured by Seishin Enterprise Co., Ltd.) and was found to be 31 μm. The specific surface area of the metal powder was measured with an automatic specific surface area measuring device (GEMINI VII2390, manufactured by Shimadzu Seisakusho Ltd.) and was found to be 37.0 m²/g.

Example 13

The oxygen absorbing agent composed of the porous Al—Fe metal powder prepared as described above (1 g) was immersed and stored in 2 mL of an aqueous storing solution prepared by adding citric acid to water to a concentration of 0.1 M. After the storage of the oxygen absorbing agent in the storing solution for 14 days, the oxygen absorbing agent was separated from the storing solution by filtration and was dried in vacuo to a water content of not more than 1% by weight as measured under conditions of not more than 200 Pa and 50° C. Thereafter, in the same manner as described above, the oxygen concentration is measured, and the amount of oxygen absorbed by the oxygen absorbing agent after elapse of 14 days from the start of the storage was calculated. Oxygen absorbing capability retention (%) was calculated from the oxygen absorption amount thus obtained by the following equation.

Oxygen absorbing capability retention (%)=(Oxygen absorption amount after elapse of 14 days from the start of the storage)/(Oxygen absorption amount just after the preparation)×100

The results were as shown in Table 3 below.

Examples 14 to 16

The measurement was carried out in the same manner as in Example 13, except that the concentration of citric acid was varied as shown in Table 3 below. The results of measurement were as shown in Table 3 below.

Example 17

The measurement was carried out in the same manner as in Example 13, except that malic acid was used instead of citric acid as the acid for the storing solution. The results of measurement were as shown in Table 3 below.

Examples 18 to 20

The measurement was carried out in the same manner as in Example 17, except that the concentration of malic acid was varied as shown in Table 3 below. The results of measurement were as shown in Table 3 below.

Examples 21 to 24

The measurement was carried out in the same manner as in Example 13, except that acids listed in Table 3 below were used instead of citric acid as the acid for the storing solution. The results of measurement were as shown in Table 3 below.

Comparative Example 3

The measurement was carried out in the same manner as in Example 13, except that water was used as the storing solution. The results of measurement were as shown in Table 3 below.

TABLE 3

| | Acid | Concentration | $PK_a$ | Oxygen absorbing capability retention (%) |
|---|---|---|---|---|
| Example 13 | Citric acid | 0.1M | $pK_{a1} = 3.15$ | 100 |
| Example 14 | | 0.25M | | 100 |
| Example 15 | | 0.05M | | 90 |
| Example 16 | | 0.01M | | 40 |
| Example 17 | Malic acid | 0.1M | $pK_{a1} = 3.4$ | 70 |

TABLE 3-continued

| | Acid | Concentration | PK$_a$ | Oxygen absorbing capability retention (%) |
|---|---|---|---|---|
| Example 18 | | 0.25M | | 100 |
| Example 19 | | 0.05M | | 50 |
| Example 20 | | 0.01M | | 40 |
| Example 21 | Glycine | 0.1M | pKa = 2.34 (carboxyl group) | 90 |
| Example 22 | Ascorbic acid | 0.1M | pK$_{a1}$ = 4.17 | 80 |
| Example 23 | Tartaric acid | 0.1M | pK$_{a1}$ = 3.0 | 100 |
| Example 24 | Maleic acid | 0.1M | pK$_{a1}$ = 1.84 | 100 |
| Comparative Example 3 | — | — | — | 25 |

As is apparent from the results of evaluation shown in Table 3 above, according to the method for storing an oxygen absorbing agent according to the present invention, the oxygen absorption activity of the oxygen absorbing agent can be maintained using a highly safe aqueous solution as a storing solution.

Storage of Oxygen Absorbing Agent in Buffer Solution

Example 25

A 0.1 M buffer solution was prepared by mixing 30.5 mL of a 0.2 M aqueous sodium hydrogenphosphate solution with 19.5 mL of a 0.2 M aqueous sodium dihydrogenphosphate solution and diluting the mixture with water to a total volume of 100 mL. The buffer solution had pH 7.0. Subsequently, the oxygen absorbing agent (1 g) composed of the porous Al—Fe metal powder used in Example 17 was immersed and stored in 1400 mL of the storing solution (buffer solution) prepared as described above. After the elapse of one month from the start of the storage, the oxygen absorbing agent was separated from the storing solution by filtration. The oxygen absorbing agent was dried in vacuo under conditions of not more than 200 Pa and 50° C. to a water content of not more than 1% by weight. Thereafter, in the same manner as described above, the oxygen concentration was measured, and the amount of oxygen absorbed by the oxygen absorbing agent after the elapse of one month from the start of the storage was calculated. The results were as shown in Table 4 below.

Example 26

The calculation of the oxygen absorbing capability retention (%) was carried out in the same manner as in Example 25, except that the mixing ratio between the aqueous sodium hydrogenphosphate solution and the aqueous sodium dihydrogenphosphate solution added was varied to prepare a buffer solution having pH 8. The results were as shown in Table 4 below.

Examples 27 to 32

The measurement was carried out in the same manner as in Example 25, except that the composition of the solute in the storing solution was varied as shown in Table 4 below. The results were as shown in Table 4 below.

Comparative Example 4

The measurement was carried out in the same manner as in Example 25, except that water was used as the storing solution. The results were as shown in Table 4 below.

TABLE 4

| | pH of storing solution (0.1M, 1400 mL) | | | Oxygen absorbing capability retention (%) |
|---|---|---|---|---|
| | Just after preparation | After storage | Composition of solute | |
| Example 25 | 7 | 7 | Sodium hydrogenphosphate/sodium dihydrogenphosphate | 50 |
| Example 26 | 8 | 8 | Sodium hydrogenphosphate/sodium dihydrogenphosphate | 50 |
| Example 27 | 9 | 9 | Glycine/sodium hydroxide | 100 |
| Example 28 | 9 | 9 | Boric acid/potassium chloride/sodium hydroxide | 100 |
| Example 29 | 10 | 10 | Glycine/sodium hydroxide | 100 |
| Example 30 | 10 | 10 | Boric acid/potassium chloride/sodium hydroxide | 100 |
| Example 31 | 11 | 11 | Glycine/sodium hydroxide | 90 |
| Example 32 | 11 | 11 | Sodium hydrogenphosphate/sodium hydroxide | 90 |
| Comparative Example 4 | 8 | >11 | — | 25 |

Examples 33 and 34

The measurement was carried out in the same manner as in Example 25, except that the concentration of the solute in the storing solution was changed to 1 M, the amount of the storing solution was changed to 80 mL, and the composition of the solute was as specified in Table 5. The results were as shown in Table 5 below.

TABLE 5

| | pH of storing solution (1M, 80 mL) | | | Oxygen absorbing capability retention (%) |
|---|---|---|---|---|
| | Just after preparation | After storage | Composition of solute | |
| Example 33 | 9 | 9 | Glycine/sodium hydroxide | 100 |
| Example 34 | 11 | 11 | Glycine/sodium hydroxide | 100 |
| Comparative Example 4 | 8 | >11 | — | 25 |

Examples 35 to 37

The measurement was carried out in the same manner as in Example 25, except that the amount of the storing solution was changed to 2 mL and the composition of the solute was as specified in Table 6. The results were as shown in Table 6 below.

TABLE 6

| | pH of storing solution (0.1M, 2 mL) | | | Oxygen absorbing capability retention (%) |
|---|---|---|---|---|
| | Just after preparation | After storage | Composition of solute | |
| Example 35 | 10 | 11 | Glycine/sodium hydroxide | 80 |
| Example 36 | 10 | 12 | Boric acid/ potassium chloride/ sodium hydroxide | 60 |
| Example 37 | 11 | 12 | Glycine/sodium hydroxide | 80 |
| Comparative Example 4 | 8 | >11 | — | 25 |

Examples 38 to 40

The measurement was carried out in the same manner as in Example 25, except that the concentration of the solute in the storing solution was changed to 1 M, the amount of the storing solution was changed to 2 mL, and the composition of the solute was as specified in Table 7. The results were as shown in Table 7 below.

TABLE 7

| | pH of storing solution (1M, 2 mL) | | | Oxygen absorbing capability retention (%) |
|---|---|---|---|---|
| | Just after preparation | After storage | Composition of solute | |
| Example 38 | 10 | 10 | Glycine/sodium hydroxide | 100 |
| Example 39 | 10 | 11 | Boric acid/ potassium chloride/ sodium hydroxide | 100 |
| Example 40 | 11 | 11 | Glycine/sodium hydroxide | 90 |
| Comparative Example 4 | 8 | >11 | — | 25 |

As is apparent from the results of measurement of residual oxygen absorption amount in Tables 4 to 7 above, the method for storing an oxygen absorbing agent according to the present invention can allow the oxygen absorption activity of the oxygen absorbing agent to be maintained using a highly safe aqueous solution as a storing solution.

The invention claimed is:

1. An oxygen absorbing agent comprising a metal powder, the metal powder having been obtained by subjecting an alloy powder comprising a component (A) and a component (B), a particle diameter of the alloy powder being in a range of 5 to 200 μm;
    component (A) comprising at least one transition metal selected from the group consisting of manganese, iron, platinum, and copper group metals, and
    component (B) comprising at least one metal selected from the group consisting of aluminum, zinc, tin, lead, magnesium, and silicon
to treatment with an acidic or alkaline aqueous solution to elute and remove at least a part of the component (B) from the alloy powder, wherein the specific surface area, as measured by a BET method, of the metal powder obtained by eluting and removing at least a part of the component (B) is at least 20 $m^2/g$.

2. The oxygen absorbing agent according to claim 1, wherein the metal powder obtained by eluting and removing at least a part of the component (B) is porous.

3. The oxygen absorbing agent according to claim 1, wherein the component (A) is selected from the group consisting of iron, cobalt, nickel, and copper.

4. The oxygen absorbing agent according to claim 1, wherein the component (B) is aluminum.

5. The oxygen absorbing agent according to claim 1, wherein the content of the component (B) in the metal powder obtained by eluting and removing at least a part of the component (B) is 0.01 to 50% by weight.

6. The oxygen absorbing agent according to claim 1, wherein the acidic or alkaline aqueous solution for the treatment is an aqueous sodium hydroxide solution.

7. The oxygen absorbing agent according to claim 1, which has a capability of absorbing at least 5 mL of oxygen per g in an atmosphere having a low humidity of 30% RH or less at 25° C.

8. An oxygen absorbing packaged body comprising: an oxygen absorbing agent according to claim 1; and a packaging material, the whole or a part of which is formed of an air-permeable packaging material, the oxygen absorbing agent having been packaged into the packaging material.

9. The oxygen absorbing agent according to claim 1, wherein the content of the component (B) in the alloy powder before eluting the component (B) is 30 to 70% by weight and the content of the component B in the oxygen absorbing agent is 0.0.1 to 50% by weight.

10. A method for storing an oxygen absorbing agent according to claim 1, the method comprising:
    immersing the oxygen absorbing agent according to claim 1 in an aqueous solution containing an acid added thereto to store the oxygen absorbing agent.

11. The method for storing an oxygen absorbing agent according to claim 10, wherein the acid has a pKa value of 1 or more.

12. The method for storing an oxygen absorbing agent according to claim 10, wherein the acid is at least one inorganic acid selected from the group consisting of phosphoric acid, sulfuric acid, hydrofluoric acid, carbonic acid, oxalic acid, and chloroacetic acid, or at least one organic acid selected from the group consisting of citric acid, glycine, tartaric acid, malic acid, maleic acid, ascorbic acid, gallic acid, lactic acid, and uric acid.

13. The method for storing an oxygen absorbing agent according to claim 10, wherein the aqueous solution containing the acid added thereto has a concentration of 5 mM to 1 M.

14. A method for storing an oxygen absorbing agent according to claim 1, the method comprising:
    immersing the oxygen absorbing agent according to claim 1 in an aqueous solution; and
    storing the oxygen absorbing agent in the aqueous solution while maintaining the aqueous solution at a pH value of 11 or less.

15. The method for storing an oxygen absorbing agent according to claim 14, wherein the oxygen absorbing agent is stored in the aqueous solution while maintaining the aqueous solution at a pH value of 7 to 11.

16. The method for storing an oxygen absorbing agent according to claim 14, wherein the aqueous solution is a pH buffer solution comprising at least one weak acid and strong base selected from inorganic acids and organic acids, or a pH buffer solution comprising a weak acid and a salt of the weak acid.

17. The method for storing an oxygen absorbing agent according to claim 14, wherein the aqueous solution is a buffer solution of boric acid/potassium chloride/sodium hydroxide or a buffer solution of glycine/sodium hydroxide.

18. The method for storing an oxygen absorbing agent according to claim 14, wherein the concentration of a solute in the aqueous solution is from 5 mM to a saturating concentration.

\* \* \* \* \*